(12) United States Patent
Snedeker (10) Patent No.: US 9,075,477 B2
(45) Date of Patent: Jul. 7, 2015

(54) TOUCH PANEL APPARATUS AND METHODS

(71) Applicant: TEXAS INSTRUMENTS INCORPORATED, Dallas, TX (US)

(72) Inventor: Michael Douglas Snedeker, Tucson, AZ (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 251 days.

(21) Appl. No.: 13/764,661

(22) Filed: Feb. 11, 2013

(65) Prior Publication Data

US 2014/0225874 A1 Aug. 14, 2014

(51) Int. Cl.
*G06F 3/041* (2006.01)
*G06F 3/0488* (2013.01)

(52) U.S. Cl.
CPC .............. *G06F 3/0418* (2013.01); *G06F 3/041* (2013.01); *G06F 3/0488* (2013.01)

(58) Field of Classification Search
CPC ..... G06F 3/041; G06F 3/0412; G06F 3/0414; G06F 3/0416; G06F 3/044; G06F 3/045; G06F 3/046; G06F 3/047; G06F 3/0418
USPC .............................. 702/82–107; 345/173–178
See application file for complete search history.

(56) References Cited

U.S. PATENT DOCUMENTS

| | | | |
|---|---|---|---|
| 6,977,646 B1 | 12/2005 | Hauck et al. | |
| 2003/0214485 A1 | 11/2003 | Roberts | |
| 2011/0061948 A1 | 3/2011 | Krah et al. | |
| 2012/0287087 A1 | 11/2012 | Lu et al. | |
| 2014/0002409 A1* | 1/2014 | Rohozin et al. | ............... 345/174 |

* cited by examiner

*Primary Examiner* — Gerald Johnson
*Assistant Examiner* — Christopher Kohlman
(74) *Attorney, Agent, or Firm* — Alan A. R. Cooper; Frank D. Cimino (57) ABSTRACT

Apparatus and methods process a set of calibration sample values acquired in response to a sequence of calibration touch events generated at known X-Y coordinate positions along a linear path across a touch panel surface. The set of calibration sample values is then curve-fitted to the path to create a characteristic model of the touch panel or a portion thereof. Run-time signals are acquired from X-Y nodes across the panel at the time of a touch event. One or more run-time signal values may be substituted into the panel characteristic model to determine a distance between an X-Y node most strongly associated with the run-time touch event and a point-of-projection of the touch event location onto the path.

18 Claims, 6 Drawing Sheets

TOUCH PANEL APPARATUS AND METHODS

TECHNICAL FIELD

Structures and methods described herein relate to touch panels and include extending accuracy at the edges of a touch panel.

BACKGROUND INFORMATION

A touch panel is an input device used to identify a particular sub-region of an overall touch sensitive area implemented by the touch panel when that sub-region is touched by a user of a device incorporating the touch panel. Touch panels are typically affixed as an overlay to information presentation screens such as light-emitting diode (LED) screens, liquid crystal display (LCD) screens, cathode-ray tube (CRT) screens, etc. to create a monolithic touch sensitive display input/output device.

Touch panels may be designed to detect a human touch using various technologies. A typical capacitive touch panel may have a series of thin conductive patterns fabricated on a clear substrate with a clear insulating layer covering the conductive pattern layer. Each of the series of thin conductive patterns forms one plate of a capacitor and the clear insulating layer forms the capacitor insulator. A human finger in contact with the clear insulating layer is also a conductor, and distorts the electrostatic fields surrounding one or more of the energized conductive patterns around the touched area. The field distortions are read out as changes in capacitance.

A grid of row and column energizing and sensing conductors commonly form an X-Y pattern of row/column crossover points referred to herein as X-Y nodes. In a typical touch panel implementation, for example, a capacitive touch panel may energize a single row of the conductive patterns while measuring a magnitude of capacitance associated with each column, one column at a time. The touch panel may then energize a next row of conductive patterns while measuring the capacitance of each column in turn, until a complete touch panel scan has collected a capacitance value for each X-Y node on the panel.

SUMMARY OF THE INVENTION

Apparatus and methods disclosed herein receive a set of calibration sample values from a touch panel in response to a sequence of touch events generated at known X-Y coordinate positions across the touch panel surface. The set of calibration sample values is then curve-fitted to an X-Y dimension associated with a linear distance across the touch panel. The resulting curve, or family of curves, are characteristic of the touch panel response as a function of linear distance at particular positions on the panel and represent a touch panel characteristic model of touch panel response.

The term "touch event" means, for purposes of this disclosure, a contact depression or state of being depressed at a point or portion of a touch panel surface by a human finger, a touch-emulating stylus, a robotically controlled touch-emulating stylus, etc., at a sampling time. A touch event causes a change in capacitance or other physical parameter associated with touch proximity at and/or surrounding the point of contact.

At run-time, structures and methods receive a set of run-time sample values associated with a run-time touch panel event. "Run-time," as used herein, means a time subsequent to the time of calibrating or characterizing a touch panel and associated with determining a position of a touch panel event other than a calibration event. The run-time sample values are evaluated and compared to each other to determine which touch panel row, column, or other linear path is most strongly associated with the run-time touch panel event.

A projection of a coordinate position of the touch event onto the most strongly-associated row, column or other linear path is determined. The magnitude of the largest run-time sample value corresponding to a node associated with the row, column, or linear path (largest-magnitude "path node") is substituted into the touch panel characteristic model. The model is then solved for a distance between the largest-magnitude path node and a point-of-projection of the touch event coordinate value along the path in a direction toward a second-largest path-associated run-time sample value. If the largest-magnitude path node is a peripheral X-Y node, however, the second-largest path-associated run-time sample value is small. In this latter case, the point-of-projection is outward, toward an edge of the touch panel.

These methods and structures may more accurately determine a position of a touch panel event as compared to merely identifying an area bounded by X-Y nodes most strongly associated with the touch panel event. Additionally, locations associated with largely unusable touch panel area at the periphery of a touch panel may be determined, rendering such peripheral areas usable.

DETAILED DESCRIPTION

Figure 1:
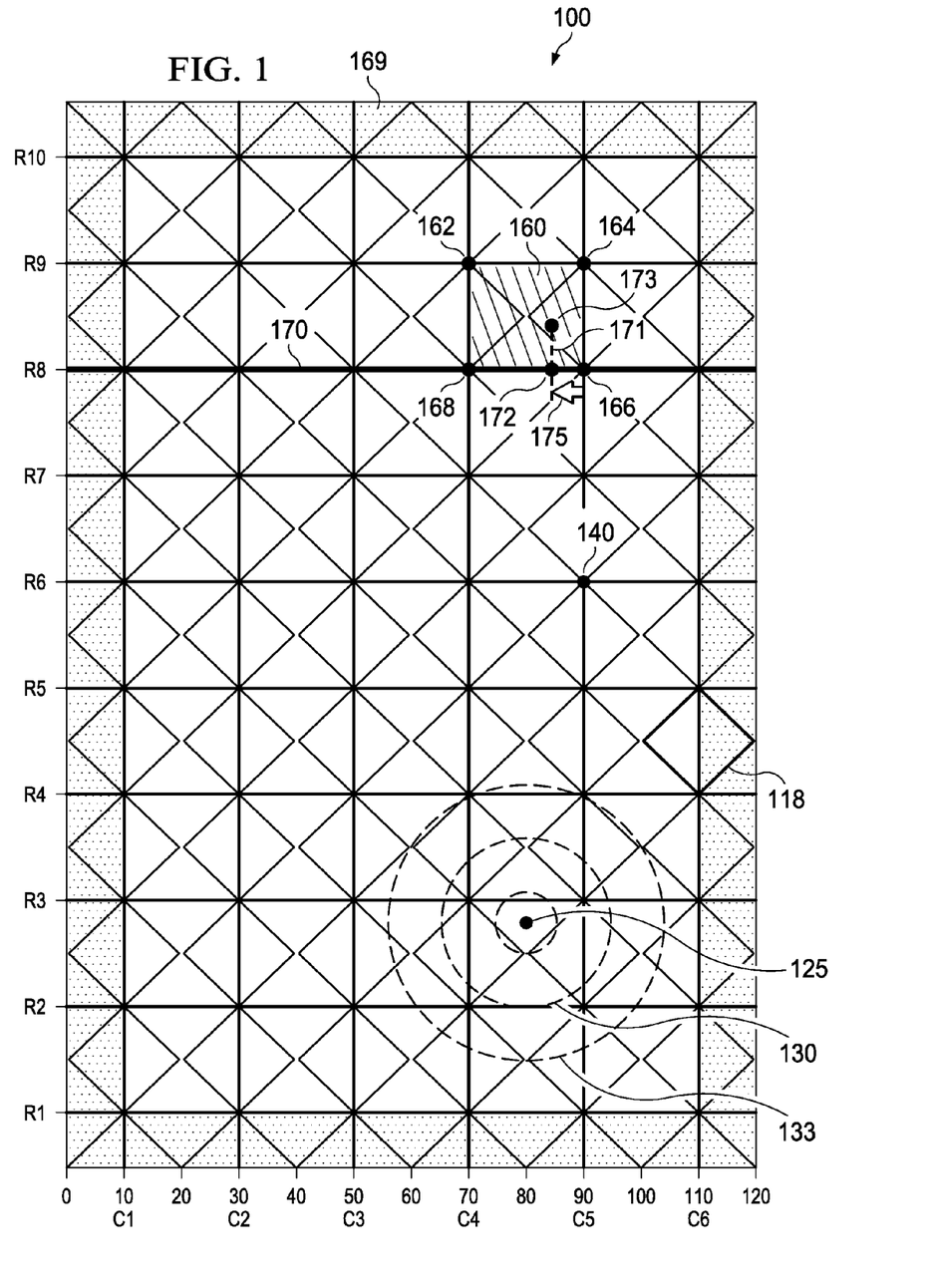
FIG. 1 is a schematic diagram of a touch panel according to various example representations of the invention.

FIG. 1 is a schematic diagram of a touch panel 100 according to various example representations of the invention. The example touch panel 100 includes 10 rows labeled R1 through R10 and six columns labeled C1 through C6. The example touch panel 100 employs capacitive technology and includes columns of diamond-shaped foil patterns (e.g., the diamond pattern 118) fabricated onto a substrate and covered with a clear insulating overlay. In this particular example touch panel 100, diamond foil patterns associated with a particular column are electrically connected. In contrast, the foil patterns along a particular row are insulated from each other. It is noted that structures and methods herein are applicable to touch panels employing capacitive and other technologies including resistive touch panels, touch panels employing light emitters and detectors, touch panels employing acoustic pulse emitters and receivers, and others. These structures and methods are also applicable to touch panels which include row and column matrices other than ten rows by six columns and sensor pattern shapes other than diamonds.

The example touch panel 100 may be scanned continuously or upon sensing a touch event. It is noted that a touch event may in general cause changes in capacitance across an area of the touch panel extending outward from the point of touch 125. However, the magnitudes of the changes in capacitance decrease as a function of the distance away from the point of touch 125. Thus, for example, touch magnitudes within an area bounded by a concentric circle 130 will likely be greater than magnitudes within an area bounded by concentric circle 133. An extended touch event may occur when the duration of a touch extends to two or more panel scan periods.

Row/column crossover points (e.g., the crossover point 140 of row 6 and column 5) are also referred to herein as "X-Y nodes." To perform a panel scan, at each node a measurement is taken of a magnitude of the deviation of the capacitance at the sample time compared to a baseline calibration capacitance previously determined for that node. The magnitudes are subsequently digitized and stored as a set of 60 data sample values and, one for X-Y node. Driver circuitry associated with the example touch panel 100 applies a drive signal to a selected row and measures the deviation of capacitance at the applicable node as a magnitude of a column sense signal common to the node. Structures and methods associated with the instant disclosure are equally applicable to other panel scanning matrices, methods and procedures, however.

Thus, in general, a set of 60 data sample values included in a single panel scan will reflect disturbances in baseline capacitance values measured at nodes surrounding the position of a touch event. This is illustrated by the concentric circles surrounding the point of touch 125 and extending out radially to multiple surrounding X-Y nodes. Prior art methods isolate the position of a touch event to an area bounded by largest-signal nodes (e.g., the area 160 bounded by nodes 162, 164, 166, and 168). Consequently, touch events occurring at peripheral areas 169 may go unrecognized if the areas 169 are unbounded by X-Y nodes outside of the touch panel area.

Apparatus and methods herein characterize touch panel response by curve-fitting sets of touch sample values measured at times corresponding to touch events created at known locations across the touch panel to create a characteristic model. Each sample value corresponds to a magnitude of a touch signal amplitude measured at an X-Y node at the time of a touch event. One or more sets of 60 sample values, one for each X-Y node, are stored at each panel scan time. The touch event location is then changed along a calibration path (e.g., the calibration path 170) as additional sets of samples are stored. The multiple sets of samples are curve fitted to create a characteristic model corresponding to the calibration path 170.

At run-time, strongest-signal touch magnitude node sample values associated with a touch event at a touch position (e.g., the touch position 173) are compared to determine a path (e.g., the path 170) most strongly-associated with the touch event. For example, the path 170 may be determined to be most strongly associated with the touch event at location 173 if the signal associated with node 166 is stronger than the signal associated with node 164 and the signal associated with node 168 is stronger than the signal associated with node 162.

Node sample values along the most strongly-associated path 170 are then compared to each other. A projection 171 of the touch event position 173 intersects the path 170 at a point 172 lying between the two strongest-signal nodes 166 and 168 along the path 170. Distance projection logic then substitutes the strongest-signal node sample value (e.g., corresponding to the node 166 in this example) into the characteristic model. From panel interior nodes, the distance projection logic determines a coordinate distance 175 from the strongest-signal path node 166 toward the second-strongest signal path node 168. The coordinate distance 175 corresponds to the coordinate of the touch position 173 along the most strongly-associated path 170.

However, if the largest-magnitude path node is an X-Y node at the panel peripheral area 169, the second-largest path-associated run-time sample value is small. In this latter case, the point-of-projection and thus the distance 175 extend outward, toward an edge of the touch panel. Some methods and structures may perform similar operations in both X-Y dimensions to determine the position 173 of the touch event within the area 160. Apparatus and methods herein may determine touch event positions within the previously unusable panel peripheral area 169. Operation of the distance projection logic to determine the coordinate distance 175 is described in further detail below.

Figure 2:
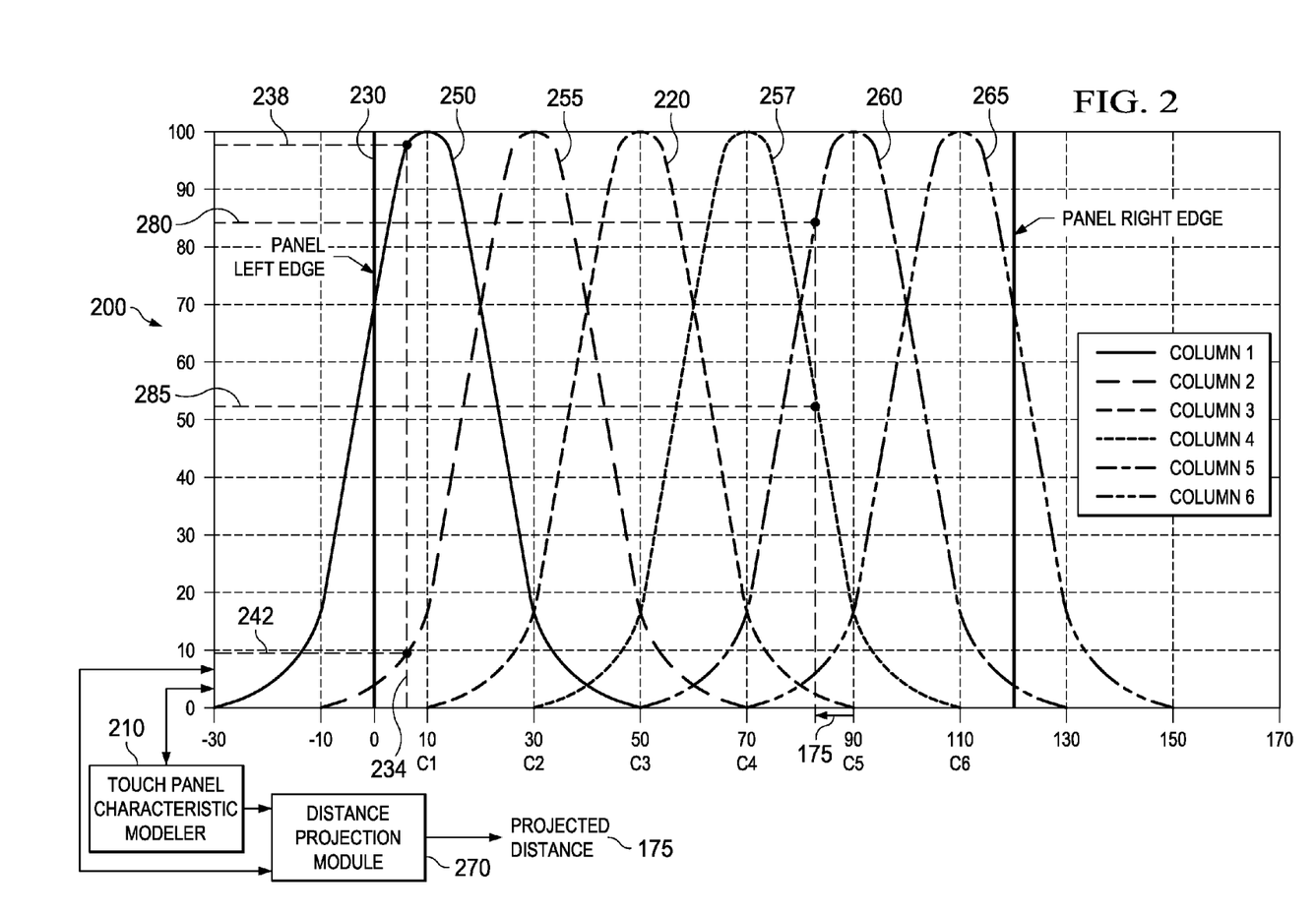
FIG. 2 is a block diagram and plot of a family of touch panel characteristic curves and a touch panel characteristic modeler according to various example representations of the invention.

FIG. 2 is a block diagram and plot 200 of a family of touch panel characteristic curves and a touch panel characteristic modeler 210 according to various example representations of the invention. The touch panel characteristic modeler 210 creates the family of touch panel characteristic curves by creating a series of touch events along a single path such as a touch panel row. To cite one example, the touch panel characteristic modeler 210 may create the series of touch events by positioning a touch-emulating stylus at an end of a selected row and slowly moving the stylus to the opposite end of that row. During a single panel scan operation (e.g., executed every few milliseconds), the touch panel characteristic modeler 210 collects a sample value corresponding to a touch signal amplitude at each X-Y node. Thus, the touch panel characteristic modeler 210 may collect 60 sample values, one from each node during a single panel scan operation at the example touch panel 100 of FIG. 1. The touch panel characteristic modeler 210 may continue to collect and store such sets of sample values as the stylus moves along the row or other path.

The family of characteristic curves of plot 200 consists of six curves, one curve made up of sample values collected by the touch panel characteristic modeler 210 for each touch panel column as indicated by horizontal axis column labels "C1" through "C6." For example, the curve 220 is plotted from sample data collected by the touch panel characteristic modeler 210 from column C3. The horizontal axis is also labeled with a distance index, a distance of zero corresponding to the panel left edge and a distance of 120 corresponding to the panel right edge. The vertical axis of plot 200 represents touch signal magnitude normalized to a maximum value of 100.

Example operations of the touch panel characteristic modeler 210 may proceed as follows. The modeler 210 positions the stylus at the panel left edge 230, depresses the stylus and begins to move the stylus to the right. At a time of a particular panel scan operation corresponding to a position 234, the characteristic modeler 210 stores a touch magnitude signal sample value 238 (e.g., a sample magnitude of approximately 98) from a column sensor corresponding to column C1.

Additionally, because the touch field extends outward from the point-of-touch 125 of FIG. 1, the characteristic modeler 210 also measures and records a sample value 242 (e.g., a sample magnitude of approximately 10) from a column sensor corresponding to column C2. Although the characteristic modeler 210 also collects sample values from columns C3-C6 during the panel scan operation corresponding to position 234, those columns are far enough away from the point-of-touch that the magnitudes of those sample values are below the noise threshold in the example shown. The characteristic modeler 210 continues to move the stylus across the row being characterized while collecting sets of sixty data samples during each panel scan operation. Various implementations may employ various panel scanning techniques, as previously mentioned. Sample values corresponding to rows other than the particular row being characterized may be collected either between column sampling times or after storing a set of six column samples associated with the row being characterized.

Thus, the touch panel characteristic modeler 210 creates a sequence of touch panel calibration events at known positions across a touch panel, collects touch magnitude data from nodes across the touch panel for each touch panel calibration event, and forms a mathematical characterization of the touch panel from the data. FIG. 2 illustrates a portion of an example mathematical characterization of the touch panel 100 of FIG. 1 created by the characteristic modeler 210. The portion of the panel characterization shown corresponds to the characterization of a single row of nodes. The example row characterization consists of the six curves 250, 255, 220, 257, 260, and 265. A full panel characterization would consists of a similar set of six curves for each row, or 60 total curves for the full example touch panel 100 of FIG. 1.

Some apparatus and methods described herein may derive touch panel characterizations by performing curve-fitting operations on stored calibration sample values, as previously mentioned. Known, generalized curve-fitting techniques may be used to produce one or more nth-degree polynomial models. Such techniques may include "ordinary least squares," "total least squares," nonlinear regression, etc. Alternatively, the calibration sample values may be fitted to a particular family of curves with shapes known to generally represent a touch panel response. Such curve families may result in exponential characterizations, parabolic characterizations, linear characterizations, etc.

At run-time, structures and methods herein receive a set of run-time sample values associated with a run-time touch panel event. The run-time sample values are compared to determine which touch panel row, column, or other linear path (e.g., the path 170 of FIG. 1 corresponding to R8) is most strongly associated with the run-time touch event. Sample values associated with nodes along the most strongly-associated linear path 170 are then compared to each other to determine the path nodes most strongly associated with the run-time touch event. For example, suppose that a strongest path node signal 280 of a magnitude of approximately 84 is sensed from a path node corresponding to C5 curve 260. Further supposed that a second-strongest path node signal 285 of a magnitude of approximately 52 is sensed from a path node corresponding to C4 curve 257.

Distance projection module 270 substitutes the magnitude of the largest path node sample value (e.g., 85 in this example) into the touch panel characteristic model (e.g., curve 260) and solves for a distance. The resulting distance (e.g., the distance 175 of FIGS. 1 and 2) is the coordinate distance between the most strongly-associated node (e.g., the node 166 of FIG. 1) and the point-of-projection of the touch event location onto the path 170 toward the second most strongly-associated path node (e.g., the node 168 of FIG. 1).

However, if the largest-magnitude path node is an X-Y node at the panel peripheral area, the second-largest path-associated run-time sample value is small. In the case of touch projection position 234, which lies within the peripheral area 169 of FIG. 1, for example, the signal 238 sensed at C1 is large. However, the second-largest signal 242 sensed at C2 is very small. In such cases of touch events occurring at the peripheral area of the panel, the point-of-projection and thus the distance 175 extend outward, toward an edge of the panel. Apparatus and methods herein may thus determine touch event positions within the previously unusable panel peripheral area 169.

Figure 3:
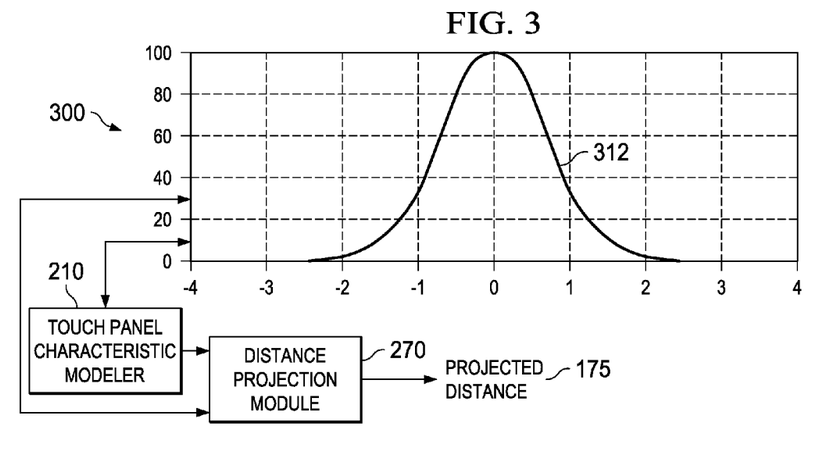
FIG. 3 is a block diagram and plot of an exponential touch panel characteristic curve and a touch panel characteristic modeler according to various example representations of the invention.

FIG. 3 is a block diagram and plot 300 of an exponential touch panel characteristic curve 312 and a touch panel characteristic modeler 210 according to various example representations of the invention. The characteristic modeler 210 may, in some instances, fit calibration sample values to an exponentially-shaped characteristic curve of the general form:

$$Z = M * \exp\left[\frac{(x-u)^2}{2*v}\right],$$

where:
Z=touch magnitude sample value
M=maximum touch magnitude sample value
x=touch event distance
u=mean touch event distance
v=touch distance variance Some variations of the characteristic modeler 210 may perform curve-fitting operations to fit the calibration sample values to the general form of the exponential characteristic curve 312. The curve-fitting operations may determine values of the parameters M, u, and v to be M=100; u=0; and v=0.5, for example. The latter values would result in the curve 312 with axes as shown in FIG. 3.

At run-time, distance projection module 270 substitutes the largest touch magnitude sample value associated with the most strongly-associated path into the exponential characteristic model, re-arranged algebraically as follows:

$$x = \pm\sqrt{\ln\left(\frac{M}{Z}\right)}$$

Touch event distance values such as the distance 175 of FIGS. 1 and 2 are represented by the variable x.

Figure 4:
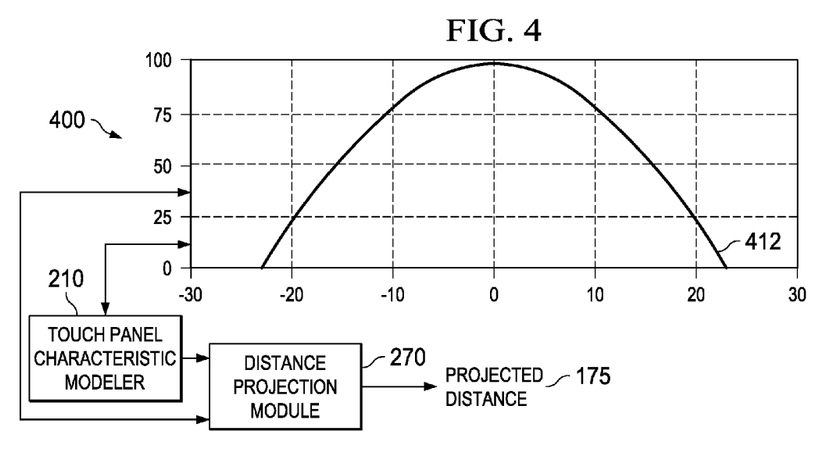
FIG. 4 is a block diagram and plot of a parabolic touch panel characteristic curve and a touch panel characteristic modeler according to various example representations of the invention.

FIG. 4 is a block diagram and plot 400 of a parabolic touch panel characteristic curve 412 and a touch panel characteristic modeler 210 according to various example representations of the invention. The characteristic modeler 210 may, in some instances, fit calibration sample values to a parabolic shape characteristic curve of the general form:

$y=ax^2+bx+c,$ where a, b, and c are parameters associated with the shape of the parabolic characteristic curve 412.

Some variations of the characteristic modeler 210 may perform curve-fitting operations to fit the calibration sample values to the general form of the parabolic characteristic curve 412. For example, suppose that the curve-fitting operations performed by the characteristic modeler 210 determine values of the parameters a, b, and c to be a=−0.2; b=0; c=100. The latter values would result in the curve 412 with axes a shown in FIG. 4.

At run-time, distance projection module 270 substitutes the largest touch magnitude sample value associated with the most strongly-associated path into the parabolic characteristic model, re-arranged algebraically as follows:

$$x = \pm \sqrt{\left(\frac{100 - y}{0.2}\right)}$$

Touch event distance values such as the distance 175 of FIG. 1 are represented by the variable x.

Figure 5:
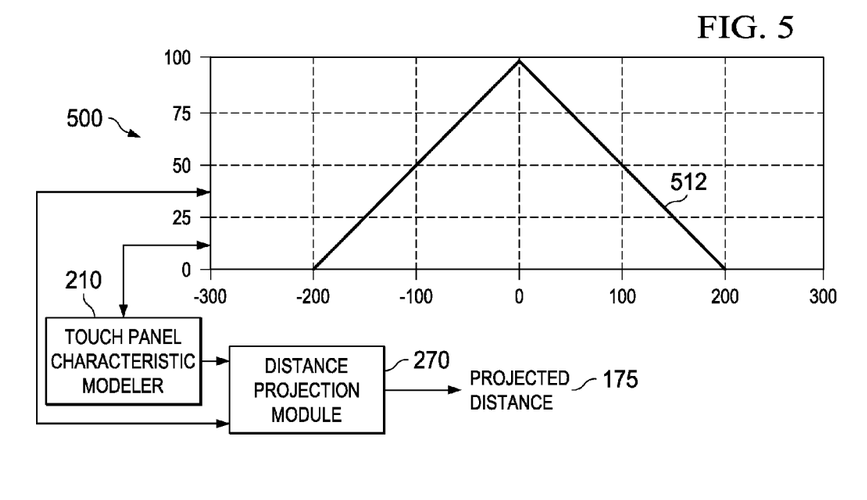
FIG. 5 is a block diagram and plot of a linear touch panel characteristic curve and a touch panel characteristic modeler according to various example representations of the invention.

FIG. 5 is a block diagram and plot 500 of a linear touch panel characteristic curve 512 and a touch panel characteristic modeler 210 according to various example representations of the invention. The characteristic modeler 210 may, in some instances, fit calibration sample values to a linearly shaped characteristic curve of the general form:

$$y = mx + b,$$

where m is the slope of a side of the linear characteristic curve and b is the y-intercept at x=0.

Some variations of the characteristic modeler 210 may perform curve-fitting operations to fit the calibration sample values to the general form of the linear characteristic curve 512. For example, suppose that the curve-fitting operations performed by the characteristic modeler 210 determine values of the parameters m and b to be m=+/−5.0; b=100. The latter values would result in the characteristic curve 412 with axes a shown in FIG. 5.

At run-time, distance projection module 270 substitutes the largest touch magnitude sample value associated with the most strongly-associated path into the linear characteristic model, re-arranged algebraically as follows:

$$x = \pm \frac{|100 - y|}{5.0}$$

Touch event distance values such as the distance 175 of FIG. 1 are represented by the variable x.

Figure 6:
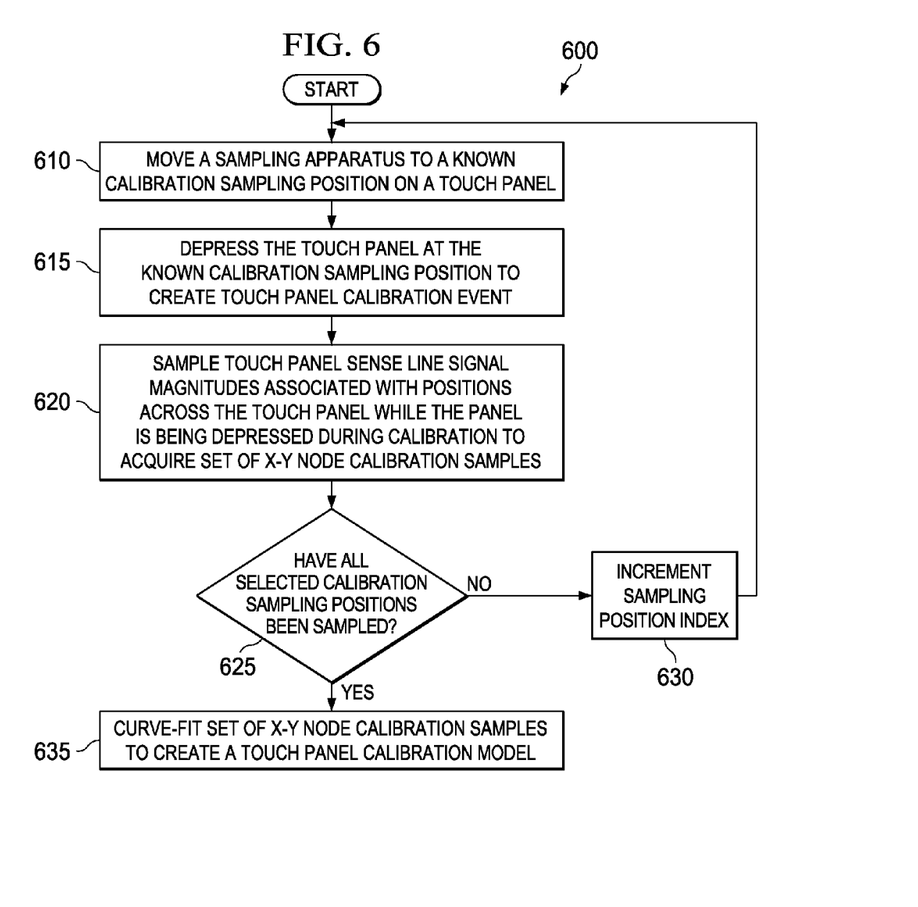
FIG. 6 is a flow diagram of a method of creating a touch panel characteristic model according to various example activities.

FIG. 6 is a flow diagram of a method 600 of creating a touch panel characteristic model according to various example activities. The method 600 commences at block 610 with moving a sampling apparatus to a known calibration sampling position of touch panel. The method 600 may also include depressing the touch panel at the known calibration sampling position to begin creating a series of touch events at known locations along a path on the touch panel, at block 615. The path may correspond to a particular row or column.

The method 600 continues at block 620 with sampling one or more sets of row or column signals to acquire a plurality of sets of X-Y node calibration sample values. The node calibration sample values are collected at times corresponding to the series of calibration touch events along the path. Each X-Y node calibration sample value represents a magnitude of a corresponding row or column calibration signal at a calibration sampling time corresponding to a position along the path (e.g., along a corresponding row or column).

For example, calibration sets of row or column data samples may be collected as the sampling apparatus is swept along a row or column between opposite edges of the touch panel. In some cases the method 600 may sweep along the row or column at a substantially constant rate to create an even distribution of calibration samples per increment of time.

The method 600 also includes checking to determine whether a selected set of calibration positions have been sampled, at block 625. If not, the method 600 includes incrementing a sampling position index at block 630 in order to initiate further sampling beginning again at block 610. If the entire selected set of calibration positions has been sampled, the method 600 continues at block 635 with curve-fitting the set of X-Y node calibration sample values to obtain a touch panel calibration model of the calibration path.

Figure 7:
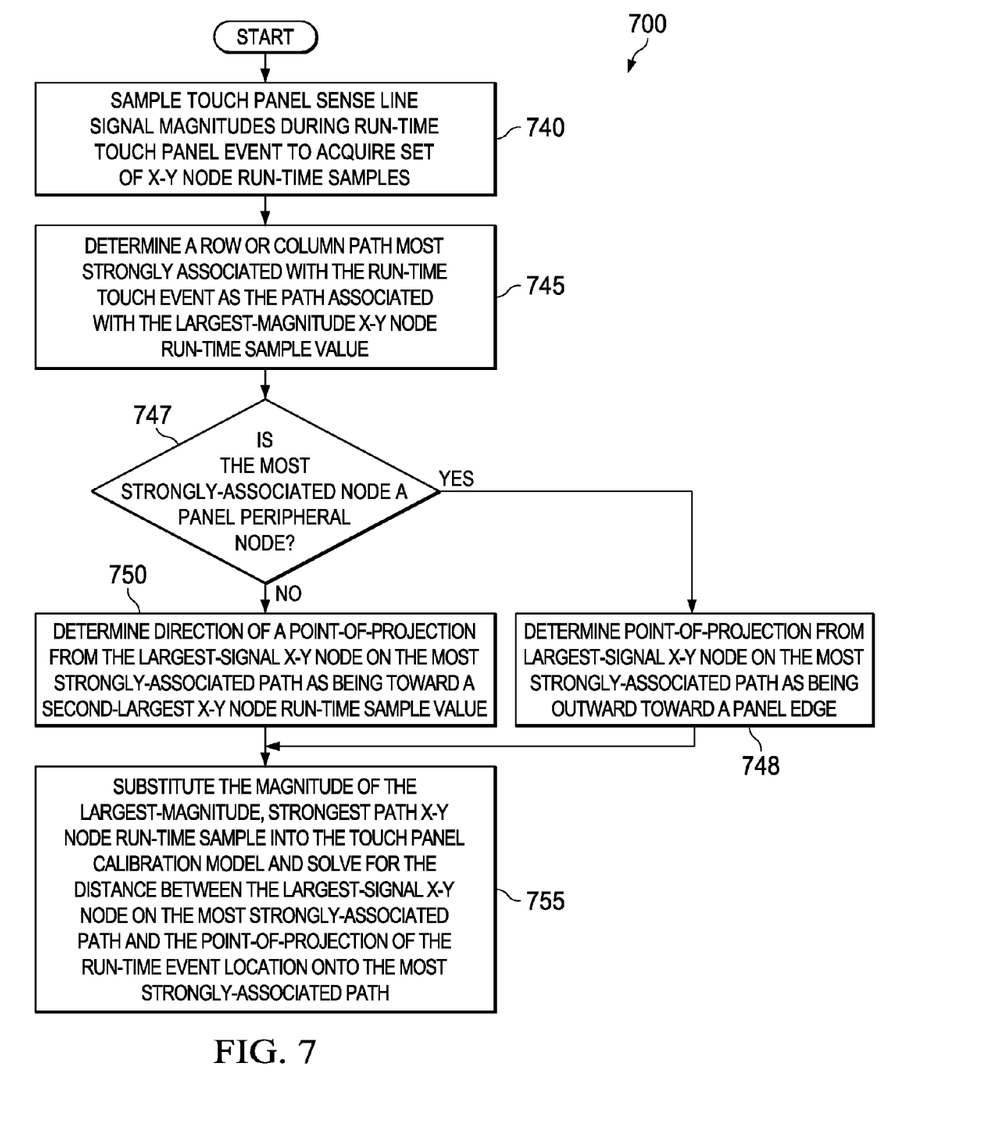
FIG. 7 is a flow diagram of a method of using a touch panel characteristic model to interpolate a position of a touch event according to various example activities.

FIG. 7 is a flow diagram of a method 700 of using a touch panel characteristic model to interpolate a position of a touch event according to various example activities. The method 700 commences at block 740 with sampling at least one of a set of row sense signals or a set of column sense signals associated with a run-time touch panel event to acquire a set of X-Y node run-time sample values.

The method 700 includes determining a path most strongly associated with the run-time touch panel event as the row or column associated with the largest-magnitude X-Y node run-time sample value, at block 745. The method 700 also includes determining whether the most strongly-associated node is a panel peripheral mode, at block 747. If so, the method 700 includes determining that the point-of-projection from the largest-signal X-Y node on the most strongly-associated path is in a direction outward toward a panel edge, at block 748. If the most strongly-associated node is not a panel a referral node, the method 700 further includes determining a direction of a point-of-projection from the largest-signal X-Y node on the most strongly-associated path as being toward a second-largest X-Y node run-time sample value, at block 750.

The method 700 also includes determining a distance between the largest-signal X-Y node on the most strongly-associated path and the point-of-projection of the run-time touch event location onto the most strongly-associated path, at block 755. To calculate the distance, the method 700 includes substituting a magnitude of the largest-magnitude X-Y node run-time sample value associated with the most strongly-associated path into the touch panel calibration model and solving for the distance.

Figure 8:
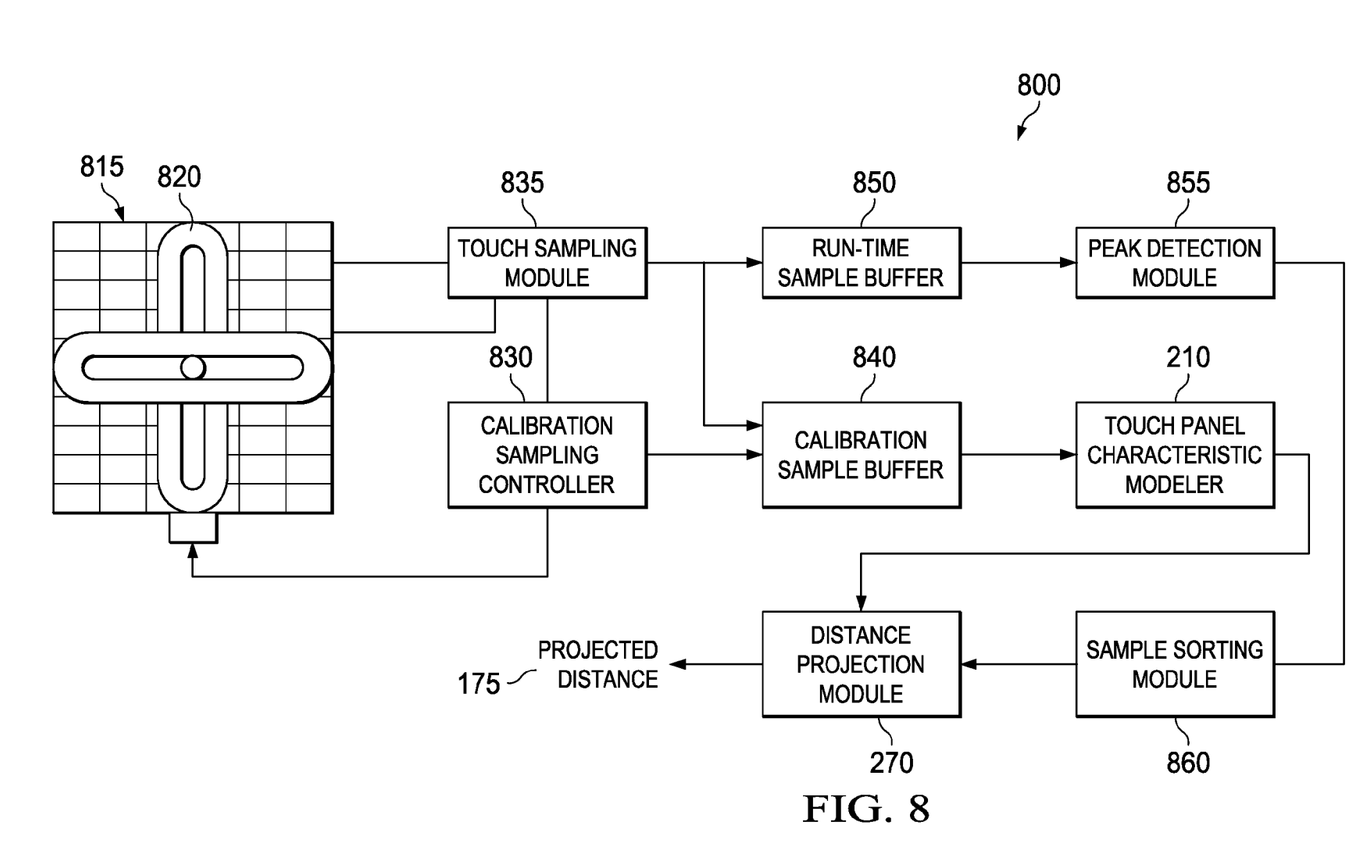
FIG. 8 is a block diagram of a touch panel characteristic model creation and interpolation apparatus according to various example representations of the invention.

FIG. 8 is a block diagram of a touch panel characteristic model creation and interpolation apparatus 800 according to various example representations of the invention. The apparatus 800 includes a calibration sampling controller 830. The controller commands an X-Y coordinate positioning apparatus 820 to position a touch-emulating stylus at a known X-Y coordinate position relative to a touch panel 815 and to depress the stylus.

The apparatus 800 also includes a touch sampling module 835 communicatively coupled to the calibration sampling controller 830. The touch sampling module 835 receives and stores a plurality of calibration sample values. Each calibration sample value corresponds to a signal amplitude associated with a touch panel node. Each node corresponding to an X-Y coordinate position associated with a touch panel row/column cross point. The signal amplitude corresponds to a physical proximity of a node to the X-Y coordinate position of the depressed stylus.

The apparatus 800 also includes a calibration sample buffer 840 communicatively coupled to the calibration sampling controller 830. The calibration sample buffer 840 stores a plurality of calibration sample values associated with stylus movement along a row or column. Each calibration sample value represents a magnitude of a row or column calibration signal at a calibration sampling time corresponding to a position along the row or column.

The apparatus 800 also includes a touch panel characteristic modeler 210 communicatively coupled to the calibration sampling controller 840. The touch panel characteristic modeler 210 receives the calibration sample values and generates a characteristic model of the plurality of node calibration sample values as a function of a path of the touch-emulating stylus across the touch panel.

At run-time, the touch sampling module 835 receives and stores a plurality of run-time sample values. Each sample value represents a signal amplitude as a measure of a physical proximity of a node to an X-Y coordinate position of a run-time touch event. The apparatus 800 also includes a run-time buffer 850 coupled to the touch sampling module 835. The run-time buffer 850 stores the plurality of run-time sample values.

The apparatus 800 further includes a peak detection module 855 communicatively coupled to the run-time buffer 850. The peak detection module 855 compares the plurality of sample values and retains a selected number of the largest-signal sample values. The apparatus 800 also includes a sample sorting module 860 communicatively coupled to the peak detection module 855. The sample sorting module 860 orders the largest-signal X-Y node sample values according to magnitude.

The apparatus 800 further includes a distance projection module 270 communicatively coupled to the touch panel characteristic modeler 210. The distance projection module 270 substitutes a sample value associated with a largest-signal node on a path most strongly associated with the run-time touch panel event into the touch panel calibration model. The distance projection module 270 also solves for a distance 170 between the largest-signal node along the most strongly-associated path and a point-of-projection from the position of the run-time touch event onto the most strongly-associated path. For outer-most largest-signal nodes, the point-of-projection is deemed to extend outward in the direction of a nearest panel edge. In the case of interior largest-signal nodes, the point-of-projection is deemed to extend in a direction toward a second-largest signal node lying on the most strongly-associated path.

Modules and components described herein may include hardware circuitry, optical components, single or multi-processor circuits, and/or memory circuits. Subject matter of the instant disclosure may also include combinations of described modules and components, as desired by the architects of the apparatus 800, the methods 6 and 7, and as appropriate for particular implementations.

Apparatus and methods described herein may be useful in applications other than characterizing a touch panel and using the resulting characterization model to interpolate touch positions within areas bounded by X-Y nodes as well as areas at touch panel margins. Examples of the methods 600 and 700 and the apparatus 800 are intended to provide a general understanding of the structures and the flow of various sequences. They are not intended to serve as complete descriptions of all elements and features of apparatus and methods that might make use of these structures and sequences.

The various apparatus and methods may be incorporated into semiconductor analog and digital circuits for use in conjunction with receptacle power converters, electronic circuitry used in computers, communication and signal processing circuitry, single-processor or multi-processor modules, single or multiple embedded processors, multi-core processors, data switches, and application-specific modules including multi-layer, multi-chip modules, among others. Such apparatus and systems may further be included as sub-components within a variety of electronic systems, such as televisions, cellular telephones, personal computers (e.g., laptop computers, desktop computers, handheld computers, tablet computers, etc.), workstations, radios, video players, audio players (e.g., MP3 (Motion Picture Experts Group, Audio Layer 3) players), vehicles, medical devices (e.g., heart monitor, blood pressure monitor, etc.), set top boxes, and others.

Apparatus and methods process a set of calibration sample values acquired in response to a sequence of calibration touch events generated at known X-Y coordinate positions along a linear path across the touch panel surface. The set of calibration sample values is then curve-fitted to the path to create a characteristic model of the touch panel or a portion thereof. Run-time signals are acquired from X-Y nodes across the panel at the time of a touch event. One or more run-time signal values may be substituted into the panel characteristic model to determine a distance between an X-Y node most strongly associated with the run-time touch event and a point-of-projection of the touch event location onto the path.

These methods and structures may more accurately determine a position of a touch panel event as compared to merely identifying an area bounded by X-Y nodes most strongly associated with the touch panel event. Additionally, locations associated with largely unusable touch panel areas at the periphery of a touch panel may be determined, rendering such peripheral areas usable. A surprising and unexpected approximately 30% of heretofore unusable panel space may be recovered thereby.

By way of illustration and not of limitation, the accompanying figures show specific aspects in which the subject matter may be practiced. It is noted that arrows at one or both ends of connecting lines are intended to show the general direction of electrical current flow, data flow, logic flow, etc. Connector line arrows are not intended to limit such flows to a particular direction such as to preclude any flow in an opposite direction. The aspects illustrated are described in sufficient detail to enable those skilled in the art to practice the teachings disclosed herein. Other aspects may be used and derived therefrom, such that structural and logical substitutions and changes may be made without departing from the scope of this disclosure. This Detailed Description, therefore, is not to be taken in a limiting sense. The breadth of various aspects is defined by the appended claims and the full range of equivalents to which such claims are entitled.

Such aspects of the inventive subject matter may be referred to herein individually or collectively by the term "invention" merely for convenience and without intending to voluntarily limit this application to any single invention or inventive concept, if more than one is in fact disclosed. Thus, although specific aspects have been illustrated and described herein, any arrangement calculated to achieve the same purpose may be substituted for the specific aspects shown. This disclosure is intended to cover any and all adaptations or variations of various aspects.

The Abstract of the Disclosure is provided to comply with 37 C.F.R. §1.72(b) requiring an abstract that will allow the reader to quickly ascertain the nature of the technical disclosure. It is submitted with the understanding that it will not be used to interpret or limit the scope or meaning of the claims. In the preceding Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. The following claims are hereby incorporated into the Detailed Description, with each claim standing on its own as a separate embodiment.

What is claimed is:

1. An apparatus for improving touch panel accuracy, comprising:
   a calibration sampling controller to command an X-Y coordinate positioning apparatus to position a touch-emulating stylus at a known X-Y coordinate position relative to a touch panel and to depress the stylus;
   a touch sampling module communicatively coupled to the calibration sampling controller to receive, sample and store a plurality of calibration sample values, each calibration sample value corresponding to a signal amplitude associated with a touch panel node, each node corresponding to an X-Y coordinate position associated with a touch panel row/column cross point, the signal amplitude corresponding to a physical proximity of a node to the X-Y coordinate position of the depressed stylus; and
   a touch panel characteristic modeler communicatively coupled to the calibration sampling controller to receive the plurality of node calibration sample values and to generate a characteristic model of the plurality of node calibration sample values as a function of a path of the touch-emulating stylus across the touch panel,
   a peak detection module communicatively coupled to the run-time buffer to compare the plurality of sample values and to retain a selected number of the largest-signal sample values; and
   a sample sorting module communicatively coupled to the peak detection module to order the largest-signal X-Y node sample values according to magnitude.

2. The apparatus of claim 1, each calibration sample value representing a magnitude of a corresponding row or column calibration signal at a calibration sampling time corresponding to a position along a corresponding row or column.

3. The apparatus of claim 1, further comprising:
   a calibration sample buffer communicatively coupled to the calibration sampling controller to store at least one of a set of column calibration sample values associated with stylus movement along a row or a set of row calibration sample values associated with stylus movement along a column.

4. An apparatus for improving touch panel accuracy, comprising:
   a touch sampling module to receive and store a plurality of sample values, each sample value corresponding to a signal amplitude associated with a touch panel node, each node corresponding to an X-Y coordinate position associated with a touch panel row/column cross point, the signal amplitude corresponding to a physical proximity of a node to an X-Y coordinate position of a run-time touch event;
   a distance projection module communicatively coupled to the touch sampling module to substitute a sample value associated with a largest-signal node on a path most strongly associated with the run-time touch panel event into a touch panel calibration model and to solve for a distance between the largest-signal node and a point-of-projection from the position of the run-time touch event onto the most strongly-associated path,
   a run-time buffer coupled to the touch sampling module to store the plurality of sample values;
   a peak detection module communicatively coupled to the run-time buffer to compare the plurality of sample values and to retain a selected number of the largest-signal sample values; and
   a sample sorting module communicatively coupled to the peak detection module to order the largest-signal X-Y node sample values according to magnitude.

5. The apparatus of claim 4, further comprising:
   a touch panel characteristic modeler communicatively coupled to the touch sampling module to receive a superset of node calibration sample values and to generate a characteristic model of the superset of node calibration sample values as a function of a path of a touch-emulating stylus moving across the touch panel.

6. The apparatus of claim 5, each calibration sample value representing a magnitude of a corresponding row or column calibration signal at a calibration sampling time corresponding to a position along a corresponding row or column.

7. A method of improving touch panel accuracy, comprising:
   sampling at least one of a set of row signals or a set of column signals to acquire a plurality of sets of X-Y node calibration sample values at times corresponding to a series of calibration touch events created at known locations along a path on a touch panel, each X-Y node calibration sample value representing a magnitude of a corresponding row or column calibration signal at a calibration sampling time corresponding to a position along a corresponding row or column;
   curve-fitting the set of X-Y node calibration sample values to obtain a touch panel calibration model of the path;
   sampling at least one of a set of row signals or a set of column signals associated with a run-time touch panel event to acquire a set of X-Y node run-time sample values;
   determining at least one of a row or column as a path most strongly associated with a run-time touch panel event;
   determining a ratio of a normalized largest-possible peak value to the largest-signal X-Y node on the most strongly-associated path, the largest-signal X-Y node sample value normalized to the largest-possible peak value;
   determining a natural logarithm of the ratio;
   calculating a square root of the natural logarithm of the ratio to determine the distance between the largest-signal X-Y node on the most strongly-associated path and the point-of-projection of the run-time touch event location onto the most strongly-associated path; and
   determining a distance between a largest-signal X-Y node on the most strongly-associated path and a point-of-projection of a run-time touch event location onto the most strongly-associated path by substituting a magnitude of a largest-magnitude X-Y node run-time sample value associated with the most strongly-associated path into the touch panel calibration model and solving for the distance.

8. The method of improving touch panel accuracy of claim 7, further comprising:
   determining the row or column most strongly associated with the run-time touch panel event as a row or column associated with a largest-magnitude X-Y node run-time sample value compared to other X-Y node run-time sample values associated with surrounding rows or columns;

for peripheral X-Y nodes, determining a direction of the point-of-projection from the largest-signal X-Y node on the most strongly-associated path as being toward a panel edge; and for interior X-Y nodes, determining a direction of the point-of-projection from the largest-signal X-Y node on the most strongly-associated path as being toward a second-largest X-Y node run-time sample value.

9. The method of improving touch panel accuracy of claim 7, further comprising:
pressing the touch panel and sweeping along a row or column between opposite edges of the touch panel to create the set of row or column calibration signals.

10. The method of improving touch panel accuracy of claim 9, further comprising:
sweeping along the row or column at a substantially constant rate to create an even distribution of calibration samples per increment of time.

11. A method of improving touch panel accuracy, comprising:
sampling at least one of a set of row signals or a set of column signals associated with a run-time touch panel event to acquire a set of X-Y node run-time sample values;
determining at least one of a row or column as a path most strongly associated with a run-time touch panel event;
determining a ratio of a normalized largest-possible peak value to the largest-signal X-Y node on the most strongly-associated path, the largest-signal X-Y node sample value normalized to the largest-possible peak value;
determining a natural logarithm of the ratio;
calculating a square root of the natural logarithm of the ratio to determine the distance between the largest-signal X-Y node on the most strongly-associated path and the point-of-projection of the run-time touch event location onto the most strongly-associated path, and
determining a distance between a largest-signal X-Y node on the most strongly-associated path and a point-of-projection of a run-time touch event location onto the most strongly-associated path by substituting a magnitude of a largest-magnitude X-Y node run-time sample value associated with the most strongly-associated path into the touch panel calibration model and solving for the distance.

12. The method of improving touch panel accuracy of claim 11, further comprising:
choosing a row or column corresponding to a largest-magnitude X-Y node sample value of all X-Y node sample values acquired from the touch panel during a sampling sequence.

13. The method of improving touch panel accuracy of claim 11, further comprising:

for peripheral X-Y nodes, determining a direction of the point-of-projection from the largest-signal X-Y node on the most strongly-associated path as being toward a panel edge; and for interior X-Y nodes, determining a direction of the point-of-projection from the largest-signal X-Y node on the most strongly-associated path as being toward a second-largest X-Y node run-time sample value.

14. The method of improving touch panel accuracy of claim 11, the touch panel calibration model consisting of a model selected from one of an exponential model, a parabolic model, or a linear model.

15. The method of improving touch panel accuracy of claim 11, further including:
normalizing the largest-possible peak value to 100.

16. The method of improving touch panel accuracy of claim 11, further comprising:
determining a numerical difference between a normalized largest-possible peak value and the largest-signal X-Y node on the most strongly-associated path, the largest-signal X-Y node sample value normalized to the largest-possible peak value;
determining a ratio of the numerical difference to a touch panel characteristic parameter value, the touch panel characteristic parameter value selected to approximate a shape of a touch panel row or column signal strength characteristic curve; and
calculating a square root of the ratio to determine the distance between the largest-signal X-Y node on the most strongly-associated path and the point-of-projection of the run-time touch event location onto the most strongly-associated path.

17. The method of improving touch panel accuracy of claim 16, further comprising:
normalizing the largest- possible peak value to 100.

18. The method of improving touch panel accuracy of claim 11, further comprising:
determining an absolute value of a numerical difference between a normalized largest-possible peak value and the largest-signal X-Y node on the most strongly-associated path, the largest-signal X-Y node sample value normalized to the largest-possible peak value; and
determining the distance between the largest-signal X-Y node on the most strongly-associated path and the point-of-projection of the run-time touch event location onto the most strongly-associated path as plus or minus a ratio of the absolute value of the numerical difference to a touch panel characteristic parameter value, the characteristic parameter value selected to approximate a shape of a touch panel row or column signal strength characteristic curve.

* * * * *